UNITED STATES PATENT OFFICE.

WILLIAM R. MOTT, OF LAKEWOOD, OHIO, ASSIGNOR, BY MESNE ASSIGNMENTS, TO NATIONAL CARBON COMPANY, INC., A CORPORATION OF NEW YORK.

ARC-LAMP ELECTRODE.

1,239,810.

Specification of Letters Patent.

Patented Sept. 11, 1917.

No Drawing. Application filed January 4, 1916. Serial No. 70,251.

*To all whom it may concern:*

Be it known that I, WILLIAM R. MOTT, a citizen of the United States, residing at Lakewood, in the county of Cuyahoga and State of Ohio, have invented a certain new and useful Improvement in Arc-Lamp Electrodes, of which the following is a full, clear, and exact description.

This invention relates to arc lamp electrodes and consists in the employment of novel combinations that beneficially affect the flaming properties when used in the production of light.

There is a compound extensively used in the paint industry, called "lithopone" which has the formula $BaSO_4.ZnS$. This material I have found to have new and useful functions in a flame carbon. It is very suitable for arc lamp electrodes, as it serves as an excellent flux for calcium fluorids and other fluorids, by preventing them from forming slag beads on the end of the electrode, that would prevent the lamp from "picking up."

The favorable action of lithopone, as regards slagging, is partly due to its decreasing the surface tension between the flame mixture and the carbon and hence causes an increased tendency of the molten flame mix, near the hot crater of the arc, to wet the carbons better than when calcium fluorid or other fluorid is used alone.

This complex compound also increases the candle power and whiteness (due to blue green and blue spectral nature of light of barium compounds and zinc) and it practically eliminates the etching of the lamp globes which is caused by the fluorin vaporous compounds from the arc. It also materially increases the life, which is due to the fact that barium sulfate (one of the constituents of lithopone) is reformed at the cooler regions of the arc after having been decomposed in the hotter portions. Thus substantially no free oxygen is eliminated from this compound to cause the undue combustion of the carbon electrodes.

There is no exact mathematical proportion to be adhered to, but I find that the ratio of lithopone to the combined fluorid content should be within certain limits. For example, with 90 to 70 parts of calcium fluorid and rare-earth fluorids, there should be 5 to 30 parts lithopone to get the best results. The percentage of lithopone should not be carried above about 50% on account of excessive slagging. On the other hand, only slight benefits will be obtained with small percentages of lithopone, say 1 or 2%. As a general proposition, it is best to use the lithopone in quantities equal to about 4% to 16% of the entire flaming material in the electrode.

As a specific illustration of an electrode which I have found to give satisfactory results, I may mention the following, but only by way of example. A solid flame carbon is made with a flame mix consisting of 19% calcium fluorid, 8% calcium sulfate, 60% rare-earth fluorids, 8% lithopone and 5% potassium carbonate. The flaming materials and the carbon flour would of course first be mixed with some binder, such as tar, pitch, and oils, in the usual proportions, that is, about 15% to 30% of the aggregate of the other constituents. In general, it is advisable to use about 30% to 60% of flame material mixed with 70% to 40% of carbon material. These homogeneous carbons are forced and baked in the usual way, well known in the art of carbon manufacture.

I have also found that good results are obtained with 19% calcium fluorid, 16% calcium sulfate, 52% rare-earth fluorids, 8% lithopone and 5% potassium carbonates. This material would be mixed with carbon and a binder in the same way as is mentioned in the first example. In place of the potassium carbonate, good results can be obtained by using a mixture of potassium carbonate, calcined potassium silicate and potassium chlorid.

I have mentioned calcium fluorid and rare-earth fluorids (made up chiefly of cerium fluorid $CeF_3$, neodymium fluorid $NdF_3$, præseodymium fluorid $PrF_3$, lanthanum fluorid $LaF_3$ and yttrium fluorid $YtF_3$) as the fluorid materials to be incorporated in the electrode, as these are the most satisfactory and the ones most generally used. However, other fluorids may be used, such as magnesium fluorid $MgF_2$, strontium fluorid $SrF_2$, barium fluorid $BaF_2$, uranium fluorid $UrF_4$, zirconium fluorid $ZrF_4$, etc., as well as double fluorids such as cryolite, potassium zirconium fluorid, sodium uranium double fluorid, etc. While I do not know that lithopone could be used with any and all fluorids, it apparently could if such fluorids themselves did not have inherent defects that would otherwise prevent their being used with the materials mentioned herein, and the term "fluorids" in the claims is intended to cover those mentioned, and also others that are, as a matter of fact, equivalents of the same.

The above invention has been described in connection with solid homogeneous electrodes, but it is not necessarily limited thereto. It could also be used with cored carbons. As is usual in manufacturing cored electrodes, the flaming paste would be squirted into carbon shells and dried at a moderate temperature to set the binder.

The exact ratio of barium sulfate to zinc sulfid in lithopone may vary considerably from the formula previously given herein. In fact, lithopone is a trade term intended to designate a product obtained by the simultaneous precipitation of barium sulfate and zinc sulfid, regardless of the exact constitution. All such variations are accordingly within the scope of my invention.

Having described my invention, what I claim is:—

1. An arc lamp electrode containing lithopone.

2. An arc lamp electrode containing a fluorid and lithopone.

3. An arc lamp electrode containing fluorids of rare-earth metals and lithopone.

4. An arc lamp electrode containing fluorids and a material containing barium sulfate and zinc sulfid.

5. An arc lamp electrode containing fluorids and a complex precipitate of barium sulfate and zinc sulfid.

In testimony whereof, I hereunto affix my signature.

WILIAM R. MOTT.